UNITED STATES PATENT OFFICE.

WILLIAM B. CHISOLM, OF CHARLESTON, SOUTH CAROLINA.

PRESERVATION OF WOOD.

No. 802,680.        Specification of Letters Patent.        Patented Oct. 24, 1905.

Application filed October 7, 1904. Serial No. 227,601.

*To all whom it may concern:*

Be it known that I, WILLIAM B. CHISOLM, a citizen of the United States, residing in the city and county of Charleston, State of South Carolina, have invented certain new and useful Improvements in Preservation of Wood; and I do hereby declare the following to be a full, clear, and exact description of the invention, such as will enable others skilled in the art to which it appertains to make and use the same.

My invention relates to certain new and useful improvements in the preservation of wood and involves the discovery that the application of fused calcium sulfid as a protecting-coating to wood surfaces and as an ingredient impregnating the pores of wood serves to protect the wood from the ravages of land and marine insect life, boring-worms, (such as the toredo,) and the like, prevents to a large extent the adherence of barnacles and vegetable growths of various kinds, and preserves the wood against the destructive effects of air and moisture.

In carrying out my invention I may apply the calcium sulfid in a liquid condition to the surfaces to be protected and coat them with a layer thereof sufficient to cover the exposed exterior. For most purposes, however, in addition to having an exterior coating of calcium sulfid upon the wood, or in lieu of such exterior coating, I may impregnate the pores of the wood with the liquefied calcium sulfid by placing the wood in a metal or other receptacle suitable for the purpose and provided with an air-tight cover, exhausting the air from said receptacle, and then admitting the liquefied calcium sulfid in quantity sufficient to be taken up by the pores of the wood to the depth of penetration desired—*i. e.*, either throughout its entire mass or to such a distance below the surface as may be found sufficient for the particular use required—or any other suitable method of impregnating the wood with the liquefied fused calcium sulfid may be employed in lieu of the one just specified.

To obtain the most satisfactory liquation of the calcium sulfid employed in carrying out my invention, I preferably take any ordinary form of sulfur—such as, for instance, lump sulfur, (seconds,)—mix the sulfur with lime or its equivalent in the proportion, by weight, of four (4) parts of sulfur to one (1) part of unslaked lime (or its equivalent) and subject the mixture to heat in a suitable kettle or other receptacle until the resultant product is wholly liquid and homogeneous. I do not restrict myself, however, to these particular proportions, as it is evident that they may be varied more or less.

I find that wood coated with calcium sulfid in accordance with my invention will remain unaffected by air or moisture even when actually submerged in water for long-continued periods of time and that the impregnated wood, whether having an exterior coating of calcium sulfid or not, will likewise resist air and moisture and the depredations of boring-worms, the toredo, and the like, whether of marine or land origin, and that the outer surfaces are protected from barnacles and vegetable growths to a very large degree. For these several reasons the invention is particularly applicable to the treatment of ships' bottoms, railway cross-ties, pier and bridge piles, and the like in addition to its wider uses as a preservative and protector for timber and wood structures generally.

Having thus described my invention, what I claim is—

1. The method of treating wood, which consists in providing it with an exterior preservative and protecting-coating of fused calcium sulfid; substantially as described.

2. The method of treating wood, which consists in impregnating its pores with a preservative and protecting-body of fused calcium sulfid; substantially as described.

3. As a new article of manufacture, wood having its pores impregnated with a preservative and protecting-body of fused calcium sulfid; substantially as described.

In testimony whereof I affix my signature in presence of two witnesses.

WILLIAM B. CHISOLM.

Witnesses:
     J. D. MULLER,
     L. W. WHITING.